United States Patent

Bzura

[11] 3,905,808
[45] Sept. 16, 1975

[54] PROCESS FOR THE RECOVERY OF METALLICS FROM BRASS SKIMMINGS

[75] Inventor: Hyman Bzura, South Orange, N.J.

[73] Assignee: Madison Industries, Inc., Madison Twp., N.J.

[22] Filed: Mar. 21, 1973

[21] Appl. No.: 343,603

[52] U.S. Cl. .............. 75/101 R; 75/114; 75/115; 423/34; 423/38; 423/41
[51] Int. Cl. .............................. C22b 19/34
[58] Field of Search .......... 75/24, 108, 115, 97 A, 75/101 R, 109, 117, 157.5, 63; 134/41; 423/34, 38, 41

[56] References Cited
UNITED STATES PATENTS

| | | | |
|---|---|---|---|
| 1,255,440 | 2/1918 | Laist | 75/115 |
| 1,375,930 | 4/1921 | Ralston | 75/117 |
| 1,402,015 | 1/1922 | Ralston | 75/63 X |
| 1,727,073 | 9/1929 | Mayer et al. | 75/24 X |
| 1,834,960 | 12/1931 | Mitchell | 75/108 |
| 1,906,074 | 4/1933 | Mertes | 423/109 |
| 1,937,632 | 12/1933 | christensen | 423/103 |
| 2,042,292 | 5/1936 | Betterton et al. | 75/24 |
| 2,362,202 | 11/1944 | Hay | 423/38 X |
| 2,626,854 | 1/1953 | Ayers | 423/41 |
| 3,269,831 | 8/1966 | Wilson | 75/24 X |
| 3,273,997 | 9/1966 | Wilson | 75/24 X |
| 3,375,069 | 3/1968 | Duval | 423/103 |
| 3,434,798 | 3/1969 | Menendez et al. | 75/115 X |
| 3,510,259 | 5/1970 | Everett | 75/115 X |
| 3,523,787 | 8/1970 | Ullrich et al. | 423/105 X |
| 3,646,946 | 3/1972 | Ford et al. | 134/41 X |
| 3,652,264 | 3/1972 | Bodson | 75/108 X |
| 3,672,868 | 6/1972 | Hasegawa et al. | 75/109 X |
| 3,744,990 | 7/1973 | Wilson | 75/24 |

Primary Examiner—Allen B. Curtis
Assistant Examiner—Thomas A. Waltz
Attorney, Agent, or Firm—Curtis, Morris & Safford

[57] ABSTRACT

Method of recovering metals and a zinc salt by-product from brass skimmings by chemical methods by crushing to loosen and expose zinc oxide from the metallics thereof, optionally screening out the larger particles (which are mainly metallic) for direct recycling, adding the remainder to a reaction vessel together with concentrated hydrochloric or sulfuric acid with agitation at a rate and ratio to react the zinc oxide but not the metallics (preferably accomplished by controlling such relative additions so as to maintain the reaction zone at a pH between 0.1 and 1.5), and rapidly settling and removing for recycling the metallics from said vessel and overflowing the zinc salt reaction product in solution (as a useful by-product).

25 Claims, 3 Drawing Figures

PROCESS FOR THE RECOVERY OF METALLICS FROM BRASS SKIMMINGS

The present invention relates to a process for treating brass-skimmings and similar waste materials for recovery of metallics and useful by-products therefrom with minimal losses.

Whenever molten brass comes in contact with air (or other oxygen containing gases), the zinc content thereof rapidly forms a surface layer of zinc oxide as an impurity. Thus in the manufacture of virgin brass and in the subsequent foundry melting of the billets, a significant amount of the zinc content of the brass is lost as zinc oxide which forms as a floating dross and additional significant amounts of the brass alloy itself is lost in skimming off the floating impurities and fluxes prior to pouring the molten brass. As a result, it has been estimated that 5% of all melted brass is lost to such skimmings. The typical metallic values in such skimming are in excess of 85% (primarily copper and zinc in alloyed form and zinc oxide).

It can be appreciated that such losses represent a significant economic consideration, which the industry since its inception has long sought to minimize by various methods for recovering the metallic content of such skimmings. Two major brass mills alone each generate an average of 400 to 750 tons of brass skimmings a month respectively.

Over the years several different methods have been attempted to recover these losses. While some of these have succeeded to some degree in reducing the losses, they all still involve substantial loss of the metal content of the brass skimmings and are additionally quite costly. There have been three principal prior art methods. Some secondary manufacturers treat the brass skimmings pyrometalurgically, for example in a rotary furnace, tieing up the zinc oxide in fluxes, thus losing 30 to 40% of the zinc content and 10 to 20% of the copper content and additionally charging about 1–3% of the market value of the brass nuggets returned for the processing.

Recovery has also been achieved by mechanical means by grinding the brass skimmings, such as by ball milling, and separating the metals from the impurities by hydraulic classification. This recovers up to 90% of the material in the brass skimmings present in metallic form with the washed out fines being discarded as waste constituting essentially all of the zinc oxide mixed with other debris (including carbon and silica) and as much as 10 to 14% by weight of copper.

In a third method, the brass skimmings are smelted and the zinc oxide layer is blown off as waste with a 1 to 3% copper loss. Most of the zinc content of the alloy is converted to zinc oxide during this process and is also lost during the blowing process. The brass is then cast into an anode with the copper content thereof purified and recovered separately by electrolytic deposition; see for example U.S. Pat. No. 1,920,820.

It is an object of the present invention to recover substantially all of the metal values of brass skimmings (or of similar alloys having copper and zinc as significant components), thus realizing typically a 10 to 20 fold reduction in losses over prior processes and at the same time achieving these results at greatly reduced processing costs.

It is a further object of the present invention to convert the zinc oxide, previously regarded and treated as a waste product, so as to recover the zinc value in the form of a useful by-product.

In a specification and in the accompanying drawings these and other objects and advantages will become more apparent, and additionally there are described and shown illustrative embodiments of the invention and various modifications thereof are suggested, but it is to be understood that these are not intended to be exhaustive, but on the contrary are given for purposes of illustration in order that others skilled in the art may more fully understand the invention so that they may modify and adapt it in various forms, each as may be best suited to the conditions to the particular use.

Figure 1:
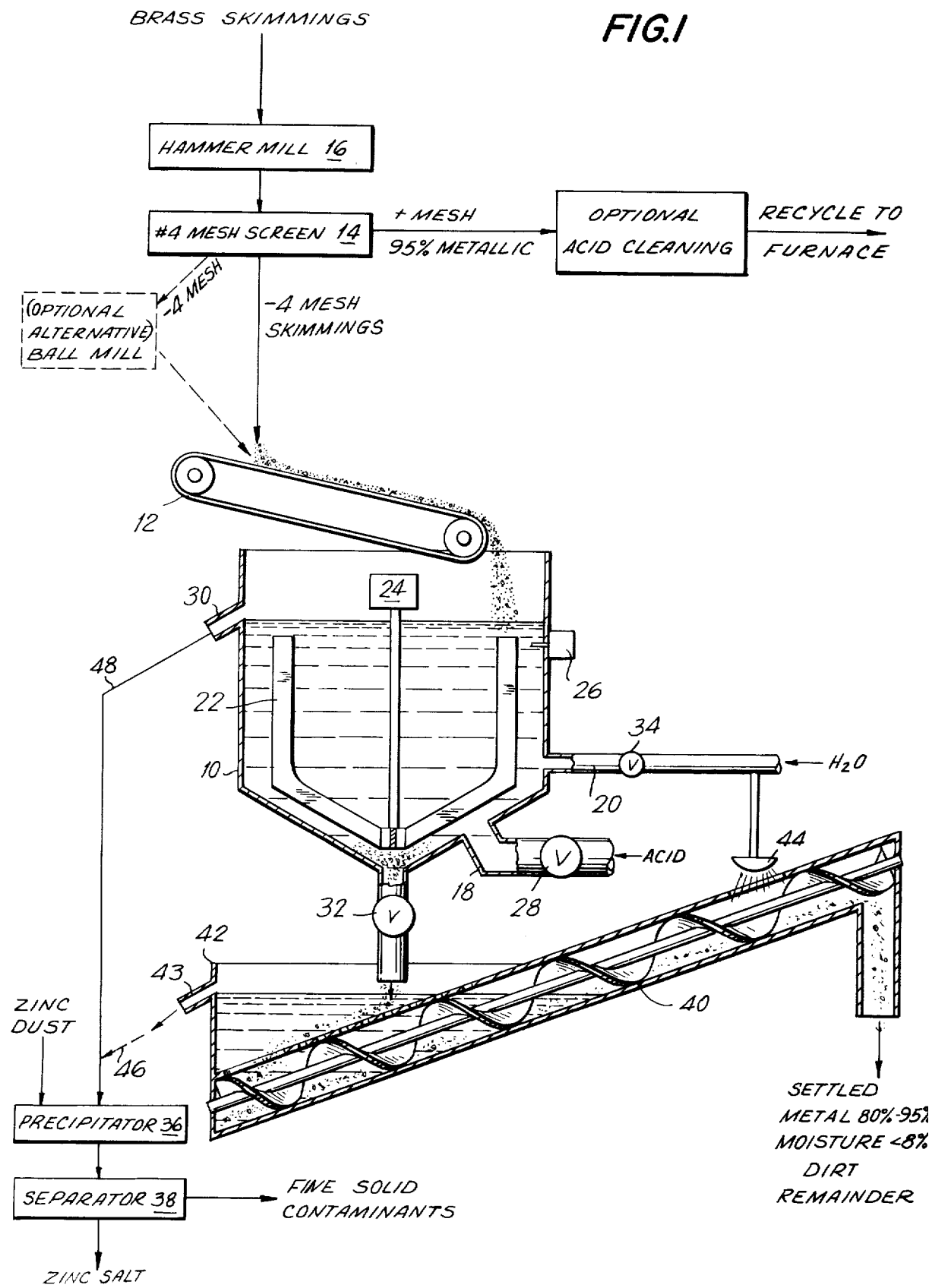
FIG. 1 is a schematic representation (partially in the form of a flow diagram) of apparatus for carrying out a preferred process embodying the present invention.

The objects and advantages of this invention are achieved by a strikingly simple and yet heretofore unobvious application of chemical methods by which 98 to 99.5 percent of the total metallic values can readily be recovered (this along giving huge economic value to the process) and further at a processing cost typically significantly less than prior art processes.

In its simplest form, the present invention involves crushing the brass skimmings, e.g. by hammer milling, to loosen and expose zinc oxide (a white powder) to subsequent attack by concentrated hydrochloric acid or slightly diluted sulfuric acid under conditions which effect conversion of the zinc oxide to a solution of zinc chloride or zinc sulfate but which are insufficient to permit any effective attack of the copper alloy particles (such conditions typically involving a reaction limited to less than 1 minute's duration and at a pH less than 3.5 and preferably ranging from 0.1 to 1.5).

Prior art methods of treating brass skimmings considered the zinc oxide as a waste product. The present invention converts the zinc of the zinc oxide to a useful by-product and does so with an efficiency such that all of the metallic values are recovered with practically no losses. Zinc chloride is useful in galvanizing iron, in soldering fluxes, in medical preparations, as a catalyst, and wood preservative, among many other uses. Zinc chloride in the past has often been produced from the zinc skimmings from galvanizing baths which typically have ammonia present in the fluxes. The present invention gives ammonia-free zinc chloride, which is highly desirable. Zinc sulfate finds uses as a preservative, in bleaching paper, as a fungicide, and a dietary supplement.

In the broader aspects of this invention, the term "brass skimmings" is intended to include the skimmings from the melt from an alloy in which copper and zinc form significant constituents such that the dross included in said brass skimmings has, in addition to said alloy, zinc oxide as a significant component. The composition of the brass skimmings will depend greatly upon not only the composition of the alloy melt, but also upon the mill practices, including the fluxes used and the skill of the skimmer. The higher the zinc content of the alloy and the longer the melt is exposed to the atmosphere, the greater will be the amount of scum floating on the alloy, particularly when the zinc content of the alloy is in excess of 20 percent and when significant amounts of fluxes are added. Charcoal, coke, or some other carbonaceous material, is the usual cover to prevent the zinc from vaporizing from the melt and also to reduce the formation of zinc oxide. Other fluxes used in an attempt to reduce the metallic content of the scum can include common salt, borax, soda ash, and even glass.

The cooled mass of brass skimmings is typically run through with metallic shot, nuggets, skeletons, and scabs. As a preliminary step in the present invention, this mass must be crushed at least to the extent required to loosen and expose most of the zinc oxide. This can be sufficiently accomplished by a relatively quick treatment by a hammer mill. The loosened mass can then be passed through a number 4 mesh screen which will typically retain 20 to 50 percent. This retained material is 85–95 percent metal with the remainder consisting of dirt and debris from the melting process which can include part of the furnace lining, silica, carbon, and other dirt. This retained material is of sufficient purity and composition that it can be directly recycled to the melting furnaces of the mill or foundry from which it was received. It also has the advantage of having the alloy composition of the mill from which it was received. If desired, this retained material can be cleaned by a quick exposure to acid, however, this is mainly for "sales appeal" by brightening the metal and resulting in only a slight upgrading of the purity.

The material passing through the screen can then be charged directly to a reaction vessel at a controlled rate. In a pilot operation, a 500 gallon reaction vessel was continuously charged at the rate of 5 tons per hour. A commercial operation will typically charge at the rate of 20 tons per hour.

Referring to FIG. 1, the reaction vessel 10 is charged by the feed device 12 receiving the minus No. 4 mesh material from the screen 14 which has already been crushed by the hammer mill 16. Acid is added to the reaction vessel 10 through inlet 18 at a similarly controlled rate. If required, water is added to the reaction vessel 10 through pipe 20. The reaction mass in the vessel 10 is continuously mixed and agitated by agitator 22 driven by motor 24.

Depending upon the by-product desired, either concentrated hydrochloric acid or concentrated sulfuric acid is added through inlet 18. The exothermic reaction of the acid with the powdered zinc oxide present in the brass skimmings is very rapid and therefore requires a reaction time of less than a minute with no heat nor pressure being required. The reaction time of the acid in attacking the metals present in the brass skimmings is comparatively slow, particularly since the relative surface area is so small due to the presence of the majority of the metal in the form of nuggets, shot, and other relatively large particles (even after the aforesaid screening).

In this foregoing example of the preferred embodiment, the brass skimmings are added to the reaction vessel 10 at the rate of 5 tons per hour. The pH of the reaction vessel is monitored by sensing device 26 which in turn controls valve 28 thus metering in the acid through inlet 18 so as to keep the reaction mass within a specific pH range.

Applicant has determined that if the reaction mass is kept within the preferred pH range, then the reaction mass is acid enough to rapidly attack effectively all of the zinc oxide and yet is not so acid as unnecessarily to attack the metallics present in the brass skimmings. For hydrochloric acid, the desirable pH range is from 0.1 to little more than 1.0 with the optimum range being from 0.3 to 0.5. For sulphuric acid, the desired range is from 0.1 to 1.5 with the optimum range being from 0.1 to 0.8. Although this process can be practiced outside these ranges, it is generally undesirable. With too low a pH, there will be an excess of acid, requiring the addition of zinc dust (or its equivalent) in order to neutralize the excess acid overflowing the weir 30 from the reaction vessel 10 and to convert the copper salts (resulting from acid attack of the brass metal) to the desired zinc salts and to precipitate out metallic copper. On the other hand, with too high a pH there will be incompletely reacted zinc oxide contaminating the reaction products exiting from the weir 30. As the pH of 3.5 is approached, the reaction becomes too slow for practical purposes, even if the residence time in the vessel 10 is greatly increased.

It is possible in the broader aspects of this invention to control the reaction by monitoring other parameters or even by metered addition or pre-analyzed reactants; none of which however are as simple and convenient as the pH control method.

The reaction product in this preferred example exits from the reaction vessel 10 by a weir overflow 30. The unreacted heavier particles, mainly consisting of solid metallics, settle to the bottom of the vessel 10 and exit through valve mechanism 32. This can be a simple diaphragm valve, a rotary valve, or even a double valve for batch removal of solids.

The reaction within vessel 10 can be subject to foaming. However this is normally not too serious a problem which can be generally controlled, if necessary, by proper agitation or other known methods including additive foam suppressants.

The acid and crushed brass skimmings are added in a conventional manner sufficiently remote from the weir overflow 30 to insure thorough mixing and sufficient residence time of the reactants in the reaction zone of the vessel 10 to assure that the zinc oxide is converted to the zinc salt before it can reach the weir overflow 30. The addition of water from supply pipe 20 to the reaction vessel 10 controlled by valve 34 is intended mainly to keep the reaction mass sufficiently dilute to insure that the zinc salt reaction product remains in solution. This is mainly required for zinc sulfate.

The liquid overflow from the weir 30 is mainly a zinc salt solution; however, it may contain minor amounts of very fine metallics, other contaminants, and perhaps some other metal salts, normally the copper salt. Consequently, (if necessary), this overflow can be subsequently treated by the addition of zinc dust to convert the other more electropositive metals to their metallic form thus creating additional zinc salts. This step has been illustrated in the form of a precipitator 36. Thereafter the liquid mass is filtered or continuously centrifuged, for example in a separator 38, to remove the solid fines. These solid contaminants will usually contain a large mass of dirt with less than one-half percent copper (by weight of the original charge). This copper contact is usually too small to be of concern, or even of value for reclamation.

The separated solids exiting through valve mechanism 32 of reaction vessel 10 are preferably subjected to a gentle washing. In FIG. 1 is illustrated an inclined screw conveyor 40 rising from an overflow wash tank 42 against a countercurrent of wash water from spray device 44. If desired, the soluble salts washed from the solid metallics can be reclaimed by combining the overflow from the tank 42 via the conduit 46 (indicated by dots as being an optional alternative) to feed into conduit 48. In this case the wash water 44 is minimized to avoid unnecessary dilution of the zinc salt solution. Conduit 48 leads from overflow weir 30 to the precipitator 36.

Depending to a large extent upon the quality of the brass skimmings received, the material recovered from the screw conveyor 40 will contain 80 to 95 percent metal, up to 8 percent moisture, and the remainder will be dirt. Further purification has been found to be unnecessary. The recovered material can be recycled directly to the melting furnaces.

Typically 95 to 99 percent or more of the zinc oxide is solubilized and separated from the metallics by conversion to a useful zinc salt by-product. The contaminants in the recovered metals are significantly reduced with any remaining amounts being well within acceptable limits for recharging to the brass furnaces. The zinc salt solution by-product is ammonia-free and has less than 10 parts per million of copper. Since the zinc salts result almost exclusively from the zinc oxide and not from the zinc in the metallic alloy, the alloy composition in the brass skimmings remains substantially unchanged and can usually be recycled directly, with little or no necessity for additional speltering.

It can be appreciated the present invention has a significant anti-pollution advantage by converting a former waste product (i.e. contaminated zinc oxide) into a useful by-product. A measure of the effectiveness and efficiency of this invention is that the discarded classification fines and/or flue dust from the various prior art processes for treating brass skimmings can economically be processed by the present invention for recovery of the metallic values and conversion of the zinc oxide to the zinc salts.

The No. 4 screen after the hammer mill 16 can be omitted.

In an alternative to the process illustrated in FIG. 1, the hammer mill 16 and screen 14 can be replaced by a ball mill 50 which crushes the brass skimmings into smaller particles for even more efficient and effective treatment. After the solidified brass skimmings are run relatively quickly through the ball mill and acid-treated, the separated settled solids can be passed over a 50 to 70 mesh screen and the solids retained thereon will be essentially pure metal. The minus 50 to 70 mesh materials are about 80 percent metallic which can be dried and charged directly to a rotary furnace and even directly to an electric furnace (depending upon the user's know how). Alternatively, it can be briquetted, advantageously with brass turnings, for aiding in charging the electric furnaces. The carbon and fluxes present in the dirt is advantageous for recycling and the silica and other dirt is probably eventually removed as fines from the separator 38 after several recyclings.

In a comparison of the present invention with the prior art practiced by the smelting and refining companies, the invention process essentially loses no copper in comparison to the latter's 1 to 3 percent loss; the invention process returns effectively all of the metallic zinc content of the brass skimmings in contrast to none returned by the manufacturers; the invention process converts the zinc oxide to a by-product in contrast to treating the zinc oxide as a waste product, and processing cost of the invention process is a fraction of the smelting and refining charges of the manufacturers. Ignoring the value of the zinc by-product derived from the zinc oxide (which can typically constitute from 15 to 25 percent of the weight in the brass skimmings), it has been estimated that the invention process can typically save the mill or foundry $150 per ton and more (where several mills generate in excess of 400 tons per month of brass skimmings).

Figure 2:
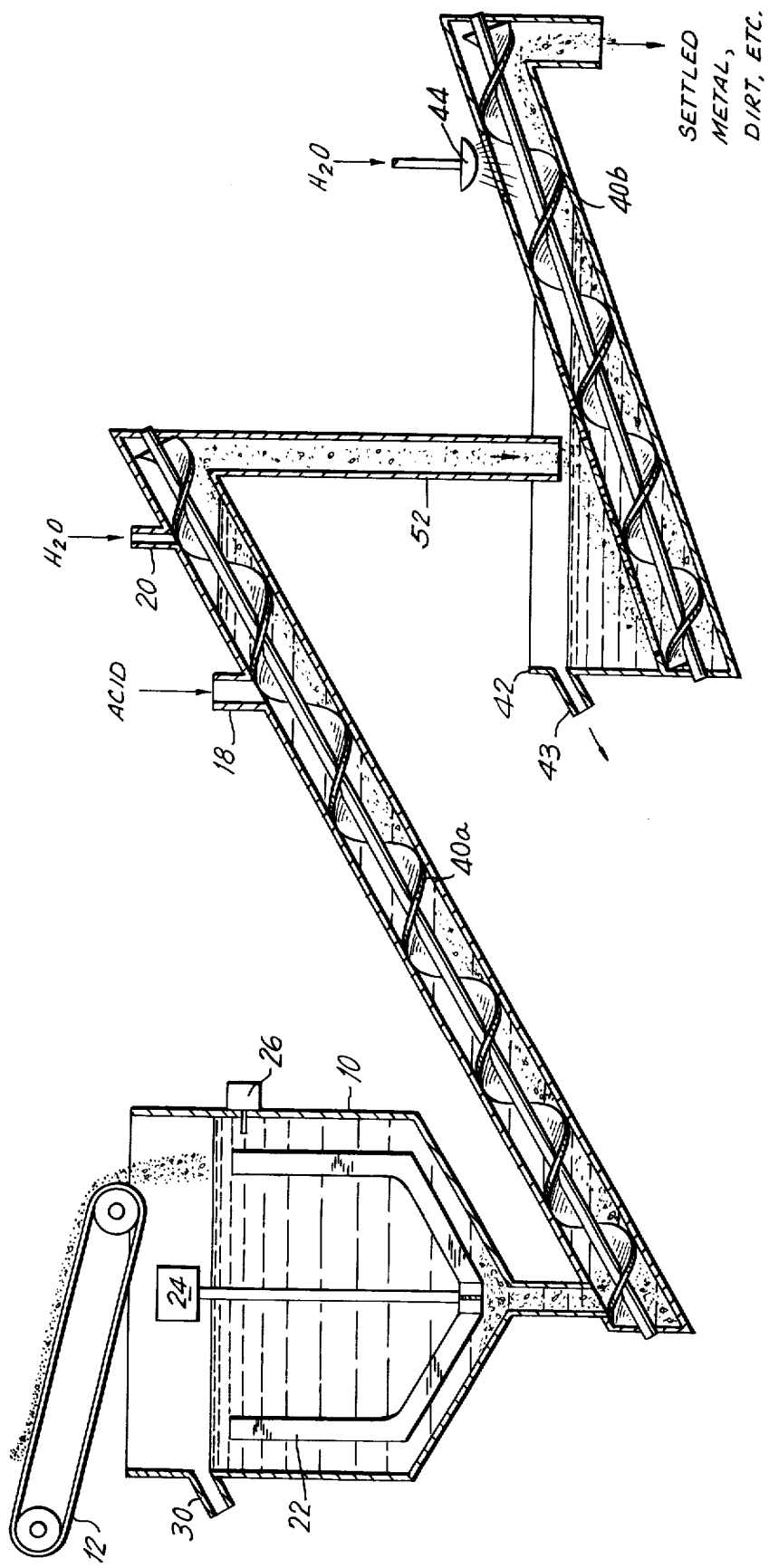
FIG. 2 is a schematic representation showing a partial modification of the apparatus depicted in FIG. 1.
Figure 3:
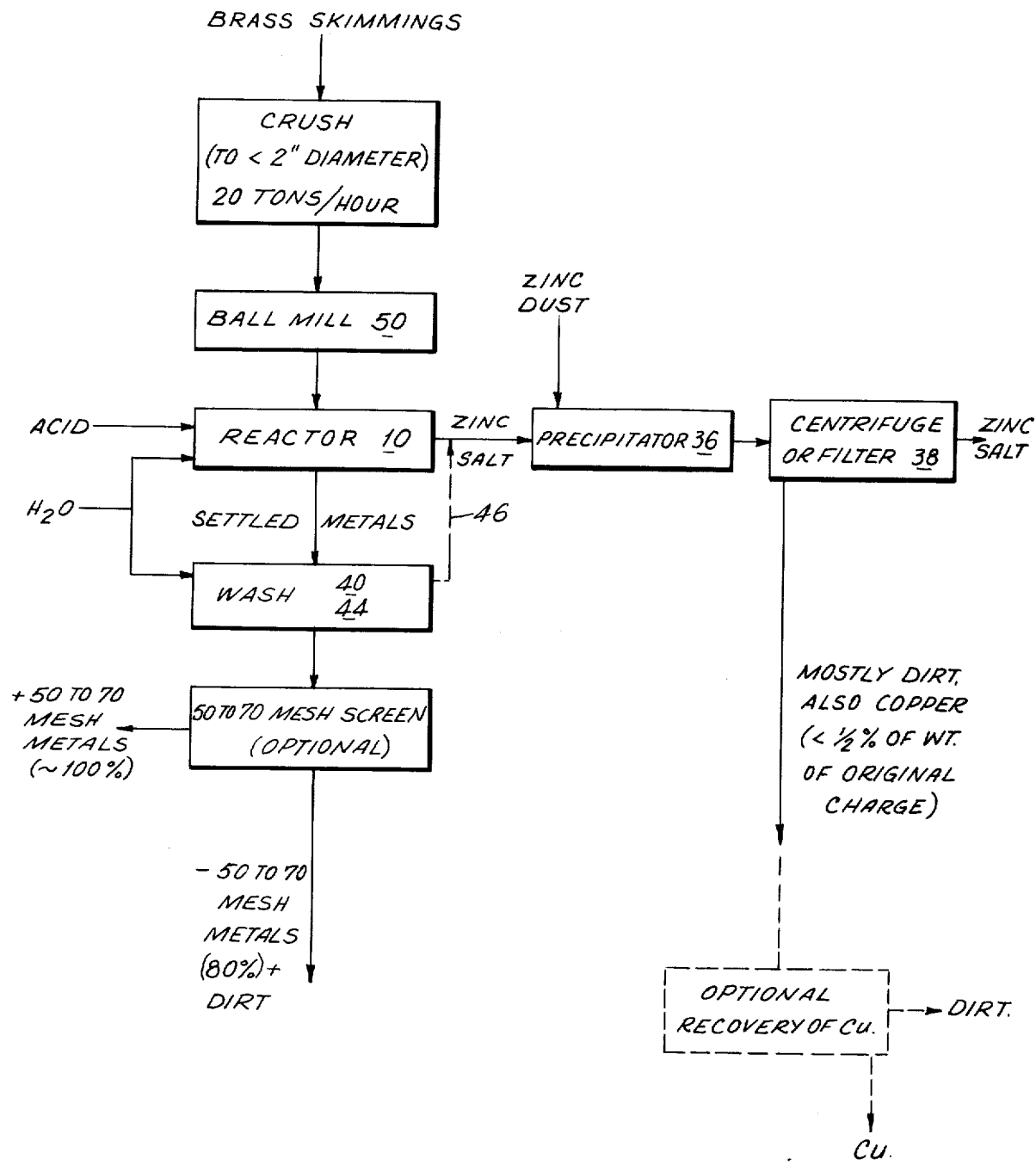
FIG. 3 is a flow diagram representing an alternative process embodying the present invention.

FIG. 2 shows a somewhat simplified apparatus for practicing the invention. The reaction vessel 10, feed 12, agitator 22, etc. are essentially the same; however, the valve 32 for the settled solids has been omitted altogether. The larger solids settle directly into the lower intake portion of the screw conveyor 40a. They are elevated above the common liquid level of the vessel 10 and of the conveyor 40a against a countercurrent of the acid introduced remotely by pipe 18. Any water needed for the reaction can advantageously be added by a pipe 20 (also remotely connected to conveyor 40a) so as to function additionally as a preliminary rinse upstream of the acid pipe 18. Feed pipe 52 carries the settled material from the delivery end of conveyor 40a to the wash tank 42 and the receiving end of the wash screw-conveyor 40b. As the solids are again elevated, they are washed of liquid contaminants and any remaining fines in a countercurrent of water (all of which overflow weir 43).

I claim:

1. Method of recovering metallics and useful by-products from a solidified mass of brass-skimmings which contain zinc oxide as a significant contaminant, comprising the steps of crushing said mass to loosen and to expose the zinc oxide from the metallics thereof, adding said crushed mass to a reaction zone, adding hydrochloric or sulfuric acid to said reaction zone, mixing said mass and said acid in said reaction zone, separating out undissolved said metallic solids from said reaction zone, withdrawing from the reaction zone the solution of zinc salts resulting from reaction of the acid with the zinc oxide, the addition to the reaction zone of said acid relative to said crushed mass being at a rate and ratio to ensure that enough acid is present and at a strength to react with substantially all the zinc oxide and to react therewith rapidly enough such that the removal of said metallics from said reaction zone can be and is accomplished before essentially any dissolving of said metallics by said acid has occurred.

2. A method according to claim 1 wherein the reactants are intimately mixed by agitation.

3. A method according to claim 2 wherein the acid is concentrated HCl or concentrated $H_2SO_4$ and water is added if needed, sufficient to keep said zinc salts in solution in the reaction zone.

4. A method according to claim 1 wherein the larger metallic solids are separated by rapid settling, the zinc salt is separated by weir overflow and the metallic and dirt fines overflowed therewith are separately separated by mechanical means.

5. A method according to claim 4 wherein the dirt and metallic fines are separated by continuous centrifuging.

6. A method according to claim 5 wherein the dirt and metallic fines are separated by filtering.

7. A method according to claim 3 wherein the addition of acid relative to said mass is controlled so as to maintain the pH of said zone between 0.1 and 1.5.

8. A method according to claim 4 wherein the addition of acid relative to said mass is controlled so as to maintain the pH of said zone between 0.1 and 1.5.

9. A method according to claim 8 wherein the addition of concentrated HCl relative to said mass is controlled so as to maintain the pH of said zone between 0.1 and 1.0.

10. A method according to claim 8 wherein the addition of concentrated $H_2SO_4$ relative to said mass is controlled so as to maintain the pH of said zone between 0.1 and 0.8.

11. A method according to claim 4 further comprising adding zinc to the weir overflow to precipitate out metallic copper from any copper salts present.

12. A method according to claim 7 further comprising adding zinc to the zinc salt solution to precipitate out metallic copper from any copper salts present.

13. A method according to claim 4 further comprising classification washing of the metallics settled out of said zone with water to further separate them from the other reactants, reaction products, and contaminants removed from the reaction zone therewith.

14. A method according to claim 13 further comprising combining the wash water with said weir overflow, adding zinc dust to precipitate copper, and centrifuging to remove copper metal fines and other dirt.

15. A method according to claim 1 further comprising screening the crushed mass to separate the larger metallic nuggets from the fines, the separated coarser material being of a sufficient quality and purity to be recycled directly, the fines thereafter being treated by said acid.

16. A method according to claim 15 wherein said screening is through a number 4 mesh or its substantial equivalent.

17. A method according to claim 16 wherein said mass is crushed by quickly passing through a hammer mill.

18. A method according to claim 8 wherein said crushing is accomplished in a ball mill and the settled solid materials from said reaction zone are screened on about a 50 to 70 mesh screen retaining effectively pure metal and treating the passed solids to classification for separation of metallic fines from the other contaminants.

19. A method according to claim 4 wherein any recovered metallic fines are briquetted for use in recycling.

20. A method according to claim 19 wherein the fines are added to brass turnings to aid in the briquetting.

21. A method according to claim 1 wherein the addition of acid relative to said mass is controlled so as to maintain the pH in said zone at about 0.1 to less than 3.5.

22. A method according to claim 4 wherein the removal from said reaction zone of said undissolved metallics is against a countercurrent of said acid being added to said reaction zone.

23. A method according to claim 22 wherein water is added upstream of said acid to rinse the removed metallics and in an amount at least sufficient to keep said zinc salts in solution in said reaction zone.

24. A method according to claim 1 wherein the solution of zinc salts withdrawn from the reaction zone contains less than one-half percent copper by weight of the original crushed massed added to said reaction zone.

25. A method according to claim 4 wherein the copper value content contained in the zinc salts separated by weir overflow is less than one-half by weight of the original crushed mass added to said reaction zone.

* * * * *

UNITED STATES PATENT AND TRADEMARK OFFICE
CERTIFICATE OF CORRECTION

PATENT NO. : 3,905,808
DATED : September 16, 1975
INVENTOR(S) : Hyman Bzura

It is certified that error appears in the above-identified patent and that said Letters Patent are hereby corrected as shown below:

Claim 25 (column 8) line 36 after "one-half" insert --percent--.

Signed and Sealed this sixth Day of April 1976

[SEAL]

Attest:

RUTH C. MASON
Attesting Officer

C. MARSHALL DANN
Commissioner of Patents and Trademarks